UNITED STATES PATENT OFFICE.

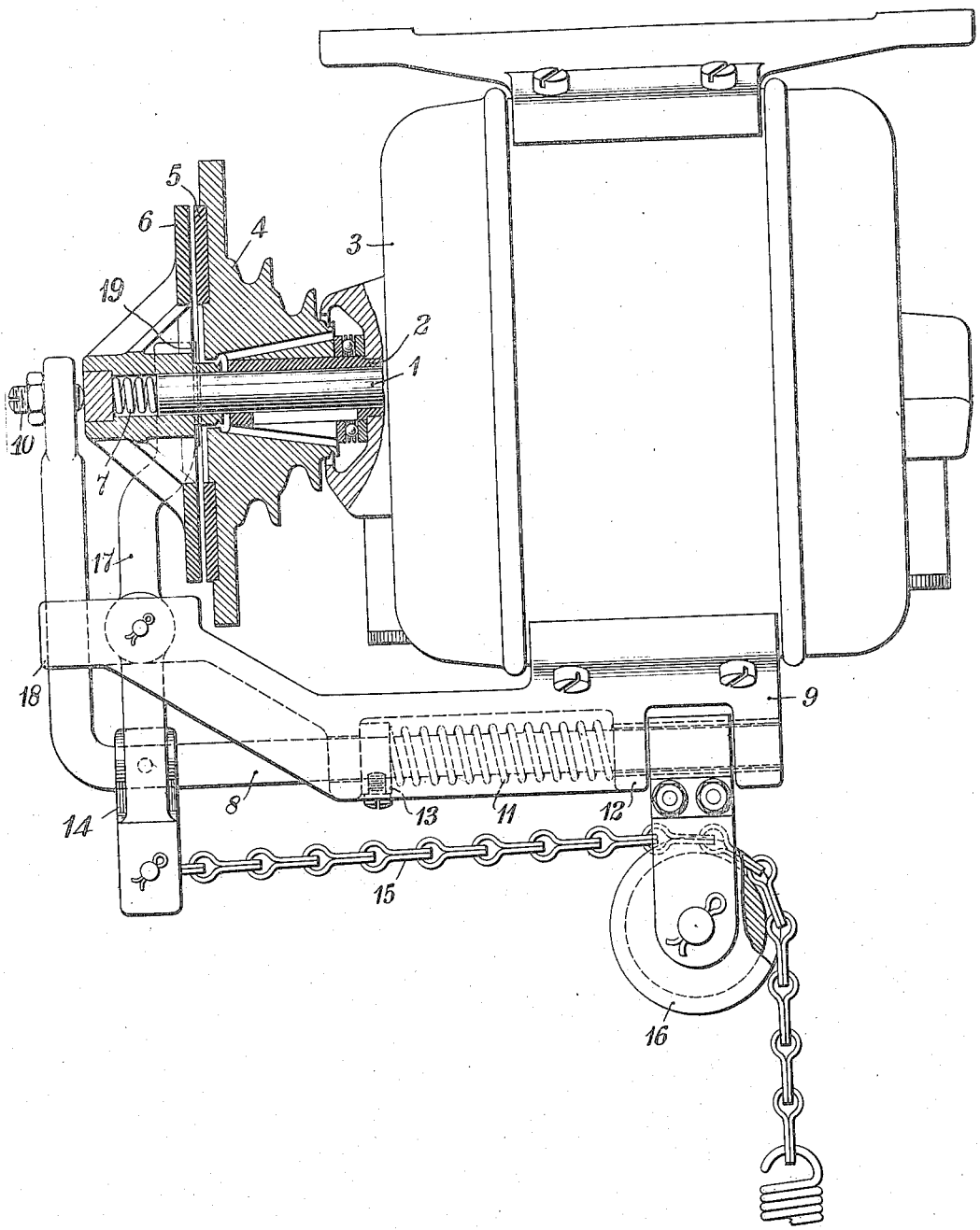

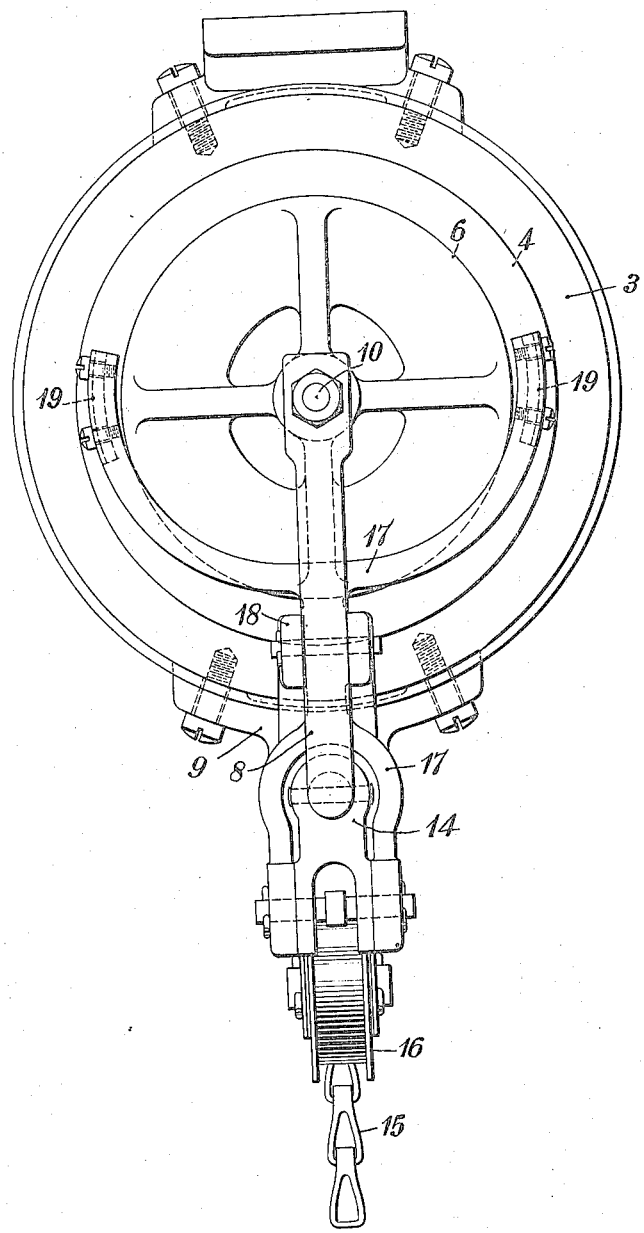

OTTO S. SCHAIRER, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

POWER-TRANSMISSION MECHANISM.

1,202,902.

Specification of Letters Patent.  Patented Oct. 31, 1916.

Application filed September 26, 1910. Serial No. 583,906.

*To all whom it may concern:*

Be it known that I, OTTO S. SCHAIRER, a citizen of the United States, and a resident of Edgewood Park, in the county of Allegheny and State of Pennsylvania, have invented a new and useful Improvement in Power-Transmission Mechanism, of which the following is a specification.

My invention relates to power transmission mechanism, and it has for its object to provide simple and effective means for establishing an operative connection between a driving and a driven member and for promptly stopping the movement of the driven member upon interruption of the said operative connection.

Figure 1 of the accompanying drawing is a side and sectional view of an electric motor provided with a device constructed in accordance with the present invention, and Fig. 2 is an end view of the motor and other parts shown in Fig. 1.

As here shown, the invention is employed in connection with an electric motor, though, of course, it may be employed in connection with other driving means. The motor shaft 1 is provided with a bearing sleeve 2 that is secured in an end bracket 3 of the motor frame and projects somewhat from the outer face of the said member. Rotatably mounted upon the projecting end of the sleeve 2, is a pulley 4 that is provided, upon its outer annular face, with a clutch member 5, here shown as a washer composed of rubber, cork, or other suitable material. Another clutch member 6, that is adapted to engage the clutch member 5 carried by the pulley 4, is keyed to the shaft 1, so as to rotate therewith and be capable of movement longitudinally thereof, the clutch members being normally maintained out of engagement by means of a spring 7.

The clutch member 6 is adapted to be pressed into engagement with the member 5 by means of an L-shaped rod 8 that is bodily and longitudinally movable with respect to the axis of the motor. The rod 8 is mounted in a guide provided in a bracket 9 that is secured to the bottom of the motor frame, a set screw 10 being provided in the end of the said member that is adjacent to the clutch member 6 for the purpose of adjusting the pressure applied between the clutch members. The rod 8 is normally maintained in the position shown by means of a helical compression spring 11 that is interposed between a lug 12 on the bracket 9 and a collar 13 that is secured to the said rod. Secured to the rod 8, near the bend therein, is a stirrup 14 to which is attached one end of a chain 15 that passes over a pulley 16 suspended from the bracket 9, the parts being so arranged that, when tension is exerted upon the chain 15, the set screw 10, at the end of the actuating rod 8, bears upon the clutch member 6 and forces it into engagement with the member 5.

Pivotally, or otherwise operatively, connected to the stirrup 14, is a brake lever 17 that is also pivoted in an extension 18 of the bracket 9, the upper end of the brake lever 17 being forked and provided with shoes 19 that bear against the outer annular face of the pulley and serve to stop the same when the clutch members are not in engagement. The extension 18 of the bracket 9 also serves as a guide for the vertical portion of the actuating rod 8.

It will be understood that, as the actuating rod 8 is drawn toward the motor by the chain 15 to cause the clutch members 5 and 6 to engage, the brake shoes 19 are raised out of engagement with the annular face of the pulley, and the pulley is thus permitted to rotate freely, whereas, when the actuating rod 8 is released, the spring returns it to the position shown, and also causes the brake shoes to bear upon the annular face of the pulley and to stop its rotation.

I claim as my invention:

1. The combination with a shaft, a pulley and a clutch member loosely mounted thereon, of another clutch member rotated by the shaft and movable longitudinally thereof into and out of engagement with the aforesaid member, a clutch actuating rod having an arm rigid therewith adapted to engage the latter clutch member, the said rod being bodily and longitudinally movable in a direction parallel to the shaft, means for normally maintaining the rod in clutch-releasing position, a brake lever actuated by the rod and a brake shoe carried thereby and normally maintained in engagement with the said pulley.

2. The combination with a shaft, a pulley and a clutch member loosely mounted thereon, of another clutch member rotated by the shaft and movable longitudinally thereof into and out of engagement with the aforesaid member, a clutch-actuating rod adapted to directly engage the latter clutch member, the said rod being bodily and longitudinally movable in a direction parallel to the shaft, a brake lever having a stationary fulcrum and actuated by the rod and a brake shoe carried thereby to engage the said pulley.

3. The combination with a shaft, a pulley and a clutch member loosely mounted thereon, of another clutch member rotated by the shaft, the said clutch members being relatively movable longitudinally of the shaft into and out of engagement with each other, a substantially L-shaped clutch-actuating rod one end of which is adapted to engage one of the clutch members, the main portion of the said rod being bodily and longitudinally movable in a direction parallel to the shaft, and a brake lever having a stationary fulcrum and one end operatively connected to the clutch-actuating rod.

In testimony whereof, I have hereunto subscribed my name this 22nd day of Sept., 1910.

OTTO S. SCHAIRER.

Witnesses:
B. B. HINES,
M. C. MERZ.